United States Patent
Steely, Jr.

(10) Patent No.: US 6,647,466 B2
(45) Date of Patent: Nov. 11, 2003

(54) METHOD AND APPARATUS FOR ADAPTIVELY BYPASSING ONE OR MORE LEVELS OF A CACHE HIERARCHY

(75) Inventor: Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 09/769,552

(22) Filed: Jan. 25, 2001

(65) Prior Publication Data

US 2002/0099913 A1 Jul. 25, 2002

(51) Int. Cl.[7] .............................................. G06F 12/00
(52) U.S. Cl. ........................ 711/138; 711/122; 711/144; 711/145
(58) Field of Search ................................ 711/138, 122, 711/144, 145, 146, 124

(56) References Cited

U.S. PATENT DOCUMENTS

| | | | | |
|---|---|---|---|---|
| 4,391,517 A | * | 7/1983 | Zucker et al. | 250/227.11 |
| 4,652,123 A | * | 3/1987 | Neumann | 356/73.1 |
| 5,074,633 A | * | 12/1991 | Cohen et al. | 359/337 |
| 5,216,728 A | * | 6/1993 | Charlton et al. | 372/6 |
| 5,265,232 A | * | 11/1993 | Gannon et al. | 711/124 |
| 5,355,467 A | * | 10/1994 | MacWilliams et al. | 711/146 |
| 5,357,332 A | * | 10/1994 | Chappel | 356/73.1 |
| 5,455,672 A | * | 10/1995 | Lamonde et al. | 356/73.1 |
| 5,461,497 A | * | 10/1995 | Mackichan | 359/177 |
| 5,471,342 A | * | 11/1995 | Junginger et al. | 359/177 |
| 5,530,933 A | | 6/1996 | Frink et al. | |
| 5,537,575 A | | 7/1996 | Foley et al. | |
| 6,201,620 B1 | * | 3/2001 | Anhorn | 359/110 |
| 6,222,652 B1 | * | 4/2001 | Roberts | |
| 6,271,962 B1 | * | 8/2001 | Choi | 359/179 |
| 6,317,255 B1 | * | 11/2001 | Fatehi et al. | 359/177 |
| 6,337,936 B1 | * | 1/2002 | Yoneyama | 385/24 |
| 6,356,980 B1 | * | 3/2002 | Arimilli et al. | 711/122 |
| 6,360,301 B1 | * | 3/2002 | Gaither et al. | 711/141 |
| 6,427,189 B1 | * | 7/2002 | Mulla et al. | 711/122 |

OTHER PUBLICATIONS

Baer et al. "On the Inclusion Properties for Multi–level Cache Hierarchies", IEEE Computer Architecture, 1988. Conference Proceedings. 15th Annual International Symposium on, May 30–Jun. 2, 1988.*

(List continued on next page.)

Primary Examiner—Mano Padmanabhan
Assistant Examiner—Paul Baker

(57) ABSTRACT

A system for adaptively bypassing one or more higher cache levels following a miss in a lower level of a cache hierarchy is described. Each cache level preferably includes a tag store containing address and state information for each cache line resident in the respective cache. When an invalidate request is received at a given cache hierarchy, each cache level is searched for the address specified by the invalidate request. When an address match is detected, the state of the respective cache line is changed to the invalid state, although the address of the cache line is left in the tag store. Thereafter, if the processor or entity associated with this cache hierarchy issues its own request for this same cache line, the cache hierarchy begins searching the tag store of each level starting with the lowest cache level. Since the address of the invalidated cache line was left in the respective tag store, a match will be detected at one of the cache levels, although the corresponding state of this cache line is invalid. This condition is specifically detected and is considered to be an "inval_miss" occurrence. In response, to an inval_miss, the cache hierarchy calls off searching any higher levels, and instead, issues a memory reference request for the desired cache line. In a further embodiment, the entity that sourced an invalidate request is stored, and a subsequent memory reference request for the same cache line is sent directly to the source entity.

22 Claims, 8 Drawing Sheets

OTHER PUBLICATIONS

Jhang et al. "A new write–invalidate snooping cache coherence protocol for split transaction bus–based multiprocessor systems" Proceedings. Computer, Communication, Control and Power Engineering. 1993 IEEE.*

Takahara, M. et al. "Splice Effects of Er–doped Fiber in Er–Doped Fiber Amplifiers." ICCS/'94. 1994, pp. 73–77.*

Zheng, W. et al. "Erbium–Doped Fiber Splicing and Splice Loss Estimation" J. Lightwave Tech. 12:3, Mar. 1994. pp. 430 435.*

Seo, H.K. et al. Gain and noise figure improvement of erbium–doped fiber amplifiers by optimizing spectral splicing condition OFC'98 Technical Digest, pp. 236–238.*

* cited by examiner

METHOD AND APPARATUS FOR ADAPTIVELY BYPASSING ONE OR MORE LEVELS OF A CACHE HIERARCHY

BACKGROUND OF THE INVENTION

1. Field of the Invention

This invention relates to computer systems and, more specifically, to multiple level cache memories used in computer systems.

2. Background Information

Most computer systems include one or more central processing units (CPUs), one or more main memories, and one or more input/output (I/O) subsystems all of which may be interconnected by a system bus. The CPUs typically fetch instructions and data from the main memories and execute those instructions. Although the processing speeds of CPUs has increased dramatically over the years, the speed of memory systems has not increased at the same rate. As a result, CPUs are often forced to wait, sometimes for significant periods of time, to receive instructions and/or data from the memories. Such delays can significantly degrade the computer system's performance. To reduce such delays, cache memories, which are often simply referred to as caches, were developed.

A cache is a small, fast memory module that is placed in close proximity to the CPU. Many caches are static random access memories (SRAMs), which are faster, but more expensive, than dynamic random access memories (DRAMs), which are often used for main memory. The cache is used to store frequently accessed instructions and/or data. That is, the cache contains an image or subset of the information from main memory. Instructions and/or data can be quickly accessed by a CPU from its respective cache, thereby reducing delays. When the CPU issues a request for instructions and/or data, a search is first made to see whether the requested instructions and/or data are resident in the CPU's cache. If they are, a cache "hit" is said to occur and the desired instructions and/or data are retrieved from the cache and provided to the CPU for processing. If the requested instructions and/or data are not found in the cache, a cache "miss" is said to occur. In this case, a request must be sent to main memory for the desired instructions and/or data. While this request is being processed, the CPU remains in a wait state. If the wait is expected to be especially long, some CPUs may begin executing a new process or thread.

The desired instructions and/or data are read out of main memory and sent to the CPU. When the instructions and/or data are received at the CPU, they are typically placed in the cache. To reduce the number of cache misses, computer architects have devised numerous schemes to try and anticipate what instructions and/or data a CPU is likely to request in the future. These "anticipated" instructions and/or data are prefetched and placed in the cache.

In most computer systems, the instructions and data at main memory are organized into units typically referred to as "blocks" or "cache lines" each of which is separately addressable. Instructions and data are typically moved about the computer system in terms of one or more blocks or cache lines. Furthermore, cache lines can be mapped into a cache in a number of different ways. The three most widely used mapping procedures are known as "fully associative mapping", "direct mapping" and "set-associative mapping". With fully associative mapping, a cache line can be placed in any location or entry of the cache. With direct mapping, every cache line maps to a single, specific cache entry. With set-associative mapping, a particular cache line can be placed in a restrictive, predetermined set of entries within the cache. Thus, a cache line is first mapped into a particular set, and is then placed in any available or free cache entry within that set.

Due to the significant advantages that they provide, nearly all, if not all, computer systems include caches. In fact, many computer systems have multiple caches organized into levels in order to improve their efficiency even further. A multilevel cache system may include, for example, two cache memory modules disposed between the CPU and the main memory. A first level (L1) cache may be directly coupled to the CPU. The L1 cache is typically very small, but very fast. A second level (L2) cache may be disposed tbetween the L1 cache and the main memory. The L2 cache is typically larger but somewhat slower than the L1 cache, although it is still faster than accessing main memory.

In most multilevel cache systems, the contents of each cache level are also present at each lower level. That is, all of the instructions and/or data at the L1 cache are also present in the L2 cache. Each higher level cache (e.g., L2), however, typically contains addition information than the preceding level (e.g., L1). This arrangement, which is known as the "subset rule", is used in order to speed up searches of the cache levels typically initiated by other CPUs in multiprocessor computer systems. More specifically, if a first CPU issues a request to main memory for a particular cache line, a search may also be made of the caches associated with the other CPUs in the computer system. If the cache hierarchy associated with each CPU follows the subset rule, a search need only be made of the highest cache level for each CPU. If the cache line is not present at the highest level cache, then it cannot be present in any of the lower levels. The computer system can thus locate particular cache lines relatively quickly. If each cache level for each CPU had to searched, the performance of the computer system could be severely degraded.

Before issuing a request to main memory, a CPU first searches all of its cache levels for the desired cache line. In particular, each cache level is searched until either a hit is obtained or a miss occurs at the highest level. That is, a search is first made of the highest level cache (e.g., L1). If there is no hit at the L1 cache, a search is made of the next level cache (e.g., L2) and so on. If there is no cache hit following the search of the highest level cache, then a request for the desired cache line is issued to main memory. As indicated above, the highest cache level of the other CPUs may also be searched for the requested cache line. If the cache line is not present at any of the caches, it is fetched from main memory and sent to the requesting CPU.

Because more than one CPU may request a copy of the same cache line from main memory, cache coherency protocols have been developed to ensure that no CPU relies on a cache line that has become stale, typically due to a change or update performed to the cache line by some other CPU. Many cache coherency protocols associate a state with each cache line. A given cache line, for example, may be in a shared state in which copies of the cache line may be present in the cache hierarchies associated with multiple CPUs. When a cache line is in the shared state, a CPU may read from, but not write to, the respective cache line. To support write operations, a cache line may be in an exclusive state. In this case, the cache line is owned by a single CPU which may write to the cache line.

When a CPU wishes to obtain exclusive ownership over a cache line that is currently in the shared state (i.e., copies of the cache line are present in the cache hierarchies of other CPUs), invalidate requests are typically issued to those other CPUs. When an invalidate request is received by a given CPU, each level of the respective cache hierarchy is searched for the cache line specified by the invalidate request. If the specified cache line is found, it is transitioned to an invalid state. Many caches assign or associate a valid bit with each cache line stored in the cache. If the bit is asserted, then the cache line is considered to be valid and may be accessed and processed by the CPU. When a is cache line is initially received from main memory, the valid bit is typically asserted and the cache line is stored in the cache. When an invalidate request is received, the valid bit of the respective cache line is deasserted, thereby reflecting that the cache line is no longer valid.

Suppose, after invalidating a cache line within its hierarchy, a CPU issues its own request for this same cache line (requesting either shared or exclusive ownership). As described above, each level of the cache hierarchy is searched for the cache line starting at the lowest cache level. Because the state of the cache line has been transitioned to the invalid state, however, a cache miss is returned by each level. That is, when the valid bit associated with a given cache line is deasserted, there can be no match to the cache line and a search of the next highest level is performed. This process is repeated until a cache miss is returned from the highest cache level. Because the cache line is invalidated from each level in which it was originally present, a miss will occur at all levels of the cache hierarchy. At this point, a request is issued to main memory and/or the other CPUs of the computer system for the respective cache line.

This arrangement of having multilevel caches and including within each higher level cache all of the information from the next lower cache has proven very useful and is now incorporated into many computer system designs. For computer systems having many cache levels, however, the searching of each level can consume a significant amount of time, during which the CPU often waits in an inactive or idle state.

SUMMARY OF THE INVENTION

Briefly, the invention relates to a system for adaptively bypassing one or more higher cache levels following a miss in a lower cache level of a cache hierarchy. Each cache level is preferably configured to store information, such as data and/or instructions, to be accessed or operated upon by a processor or entity that is associated with the cache hierarchy. The information within each cache level is preferably organized into lines or blocks and each cache level includes a tag store. The tag store contains an address and a state for each cache line resident in the respective cache. A cache line may be in any number of states, including a shared state, in which the cache line can be owned by multiple processors, and an exclusive state in which the cache line is owned by only a single processor. When a processor wishes to obtain exclusive ownership of a given cache line that is in the shared state, invalidate requests are sent to those other processors that have a shared copy of the cache line.

When an invalidate request is received at a given cache hierarchy, each cache level is searched for the address specified by the invalidate request. When an address match is detected, the state of the respective cache line is changed to the invalid state. The address of the cache line, however, is left in the tag store. Thereafter, if the processor or entity issues its own request for this same cache line, the cache hierarchy begins searching the tag store of each level starting with the lowest cache level. Since the address of the invalidated cache line was left in the respective tag store, a match will be detected for the address of the requested cache line at one of the cache levels, although the corresponding state of this cache line is invalid. In accordance with the present invention, such a distinction (i.e., an address hit, but an invalid state) is specifically detected by the cache hierarchy and is considered to be an "inval_miss" occurrence. In response to an inval_miss, the cache hierarchy calls off searching any higher cache levels, and instead, issues a request to main memory for the desired cache line. That is, the searching of higher cache levels is bypassed upon detecting an address match of an invalid cache line. Accordingly, time is not wasted searching the higher cache levels.

In a further aspect of the present invention, invalidate requests include the identity of the source processor or entity that is seeking exclusive ownership of the respective cache line. When such an invalidate request is received and a match is detected in a given cache level for the cache line specified by the invalidate request, the cache hierarchy not only changes the state of the cache line to invalid, it also stores the source processor identifier in the respective cache line. In other words, the cache hierarchy overwrites the cache line, or a portion thereof, with the source processor identifier. Since the state of the cache line is invalid, the cache line is no longer reliable and thus of no use to the processor. Thereafter, if the processor or entity associated with the cache hierarchy requests this same cache line and an inval_miss condition is detected, the source processor identifier that was stored in the cache line is retrieved. The cache hierarchy then issues a request for the cache line directly to the identified source processor, either in addition to or in place of the request that is sent to main memory.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
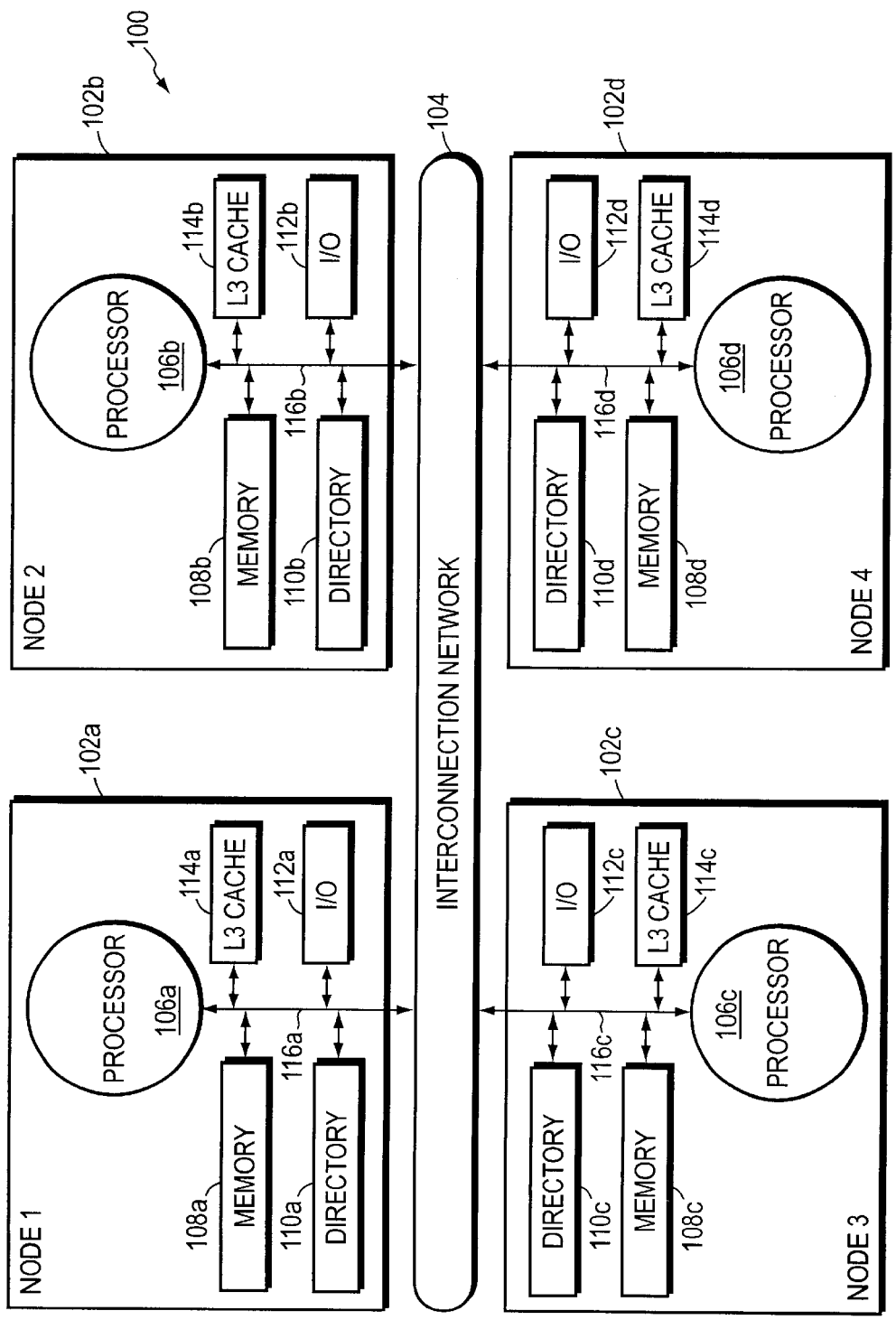
FIG. 1 is a highly schematic block diagram of a multi-processor computer system in accordance with the present invention.

FIG. 1 is a block diagram of a multiprocessor computer system 100. The system 100 includes a plurality, e.g., four, processing nodes 102a–d that are in communicating relationship with each other through an interconnection network 104. Each processing node 102 includes a processing element 106a–d, a main memory subsystem 108a–d, a directory 110a–d, an input/output (I/O) subsystem 112a–d, and a cache memory module 114a–d. The components comprising a given processing node 102 are preferably connected with each other through a local bus 116a–d. As described below, cache memory module 114 represents one level, namely the highest level, of a multilevel cache hierarchy associated with each processing element 106.

The data stored in the memory subsystems 108 are preferably organized into is blocks. As described below, any processing node (e.g., node 4) may obtain one or more blocks of information from the memory subsystem of any other processing node (e.g., node 2) by issuing a memory reference request preferably directed to a 64-byte cache line granularity. The directories 110 are used to store status information regarding the data contained in the respective main memory subsystem 108. For example, directory 110a preferably contains a state (e.g., shared, exclusive, etc.) and a location of copies (e.g., node 2, node 3, etc.) for each block within main memory subsystem 108a. Memory reference requests are thus processed by the respective directory.

Figure 2:
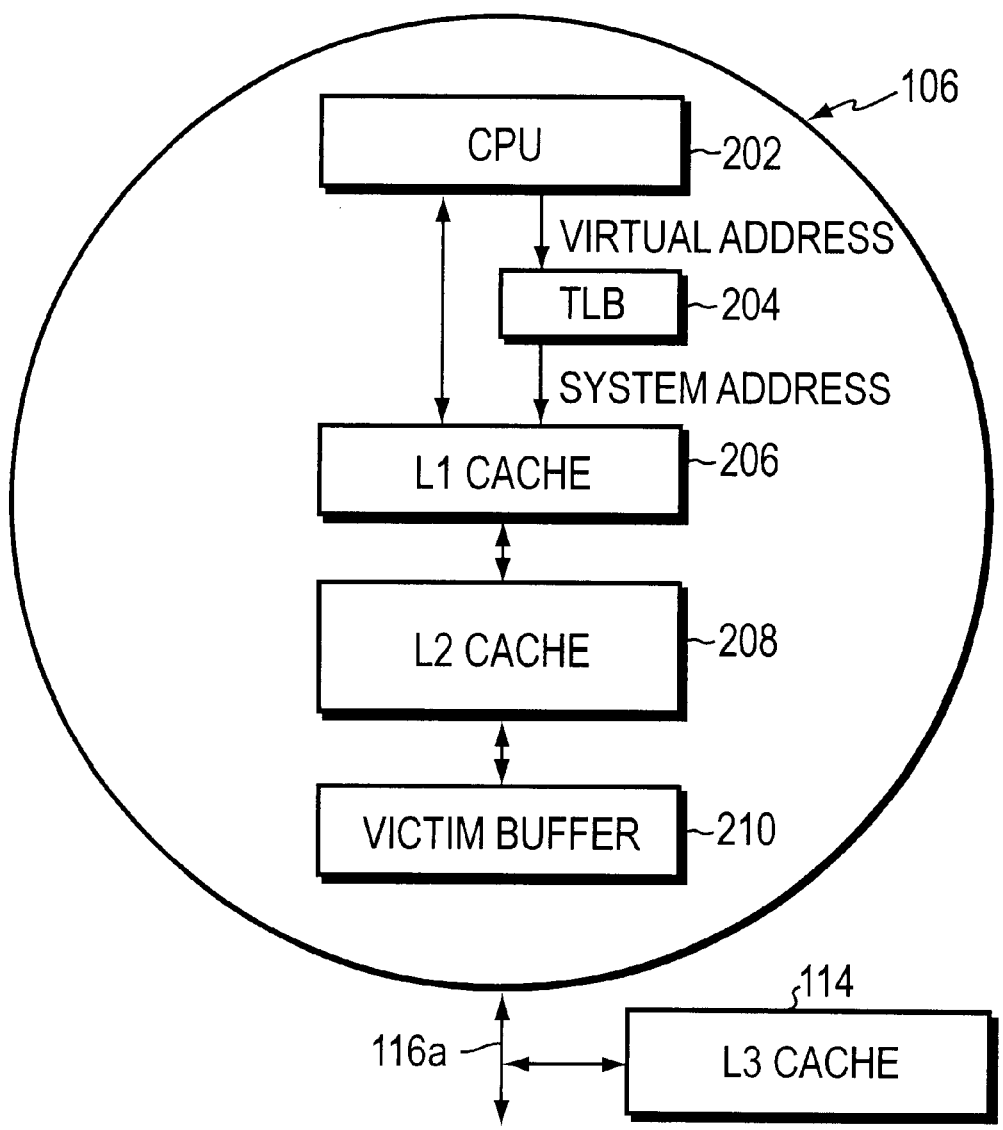
FIG. 2 is a highly schematic block diagram of a processing element of the computer system of FIG. 1.

FIG. 2 is a highly schematic block diagram of a processing element 106 having a multilevel cache hierarchy. The processing element 106 includes a central processing unit (CPU) 202 and a translation look-aside buffer (TLB) 204. Associated with the CPU 202 are multiple levels of a cache hierarchy. More specifically, each processing element 106 preferably includes a first level (L1) cache memory module 206 and a second level (L2) cache memory module 208. L1 cache 206 together with L2 cache 208 and third level (L3) cache 114 comprise the cache hierarchy associated with CPU 202. The L1 and L2 caches 206, 208 may be physically located within an integrated circuit that includes the CPU 202, thereby allowing the CPU 202 fast access to data stored at the L1 and L2 caches 206, 208. The L3 cache 114 is an external cache. That is, it is not part of the integrated circuit from which the CPU 202 is formed. Nonetheless, accesses to the L3 cache 114 can be performed faster than accesses to the main memory subsystem 108 associated with the processing element 106 and/or the other main memory subsystems 108.

The three caches associated with CPU 202 are arranged in a hierarchical fashion. That is, the L1 cache 206 may be a relatively small cache having a relatively small number of storage locations that is physically located close to the CPU 202 to support high-speed access. The L2 cache 208 has a larger storage capacity as compared to L1, but is further away from the CPU 202 than L1. The L3 cache 114 is even larger than L2, but is even further removed from the CPU 202 than L1 or L2. In the illustrative embodiment, the L1 cache 206 may have up to 256 entries each storing 64 bytes of data (i.e., a 16K cache). The L2 cache 208 may have up to 1536 entries each storing 64 bytes of data (i.e., is a 96K cache). The L3 cache 114 may have 65,000 or more entries each storing 64 bytes of data (i.e., a 4Mb cache).

For purposes of this patent application, a "higher" cache level refers to a cache whose contents, based on a request from the cache hierarchy's respective processor, are examined or compared later than the contents of a "lower" cache level. Typically, a higher cache level is located further away from the respective processor than a lower cache level. Thus, the L3 cache 114 is considered to be a higher cache level with respective to both the L1 and L2 caches 206, 208. Conversely, the L1 cache 206 is considered to be a lower cache level with respect to both the L2 and L3 caches 208, 114.

In addition to employing a hierarchical design, the cache hierarchy associated with each processing node 106 also adheres to the "subset rule". As described above, under the subset rule, every cache line present in a given level of the cache hierarchy is also present in every higher level. Accordingly, a cache line present at the L1 cache 206 is also present at the L2 cache 208 and the L3 cache 114. The main memory subsystems 108a–d represent all available blocks or cache lines in the system 100. The cache hierarchy is preferably organized as a write-back cache. Accordingly, a victim buffer 210 may be provided to buffer modified cache lines waiting to be written back to the respective main memory subsystem 108. Nonetheless, it should be understood that other cache organizations, such as write-through, may be used in connection with the present invention.

Figure 3:
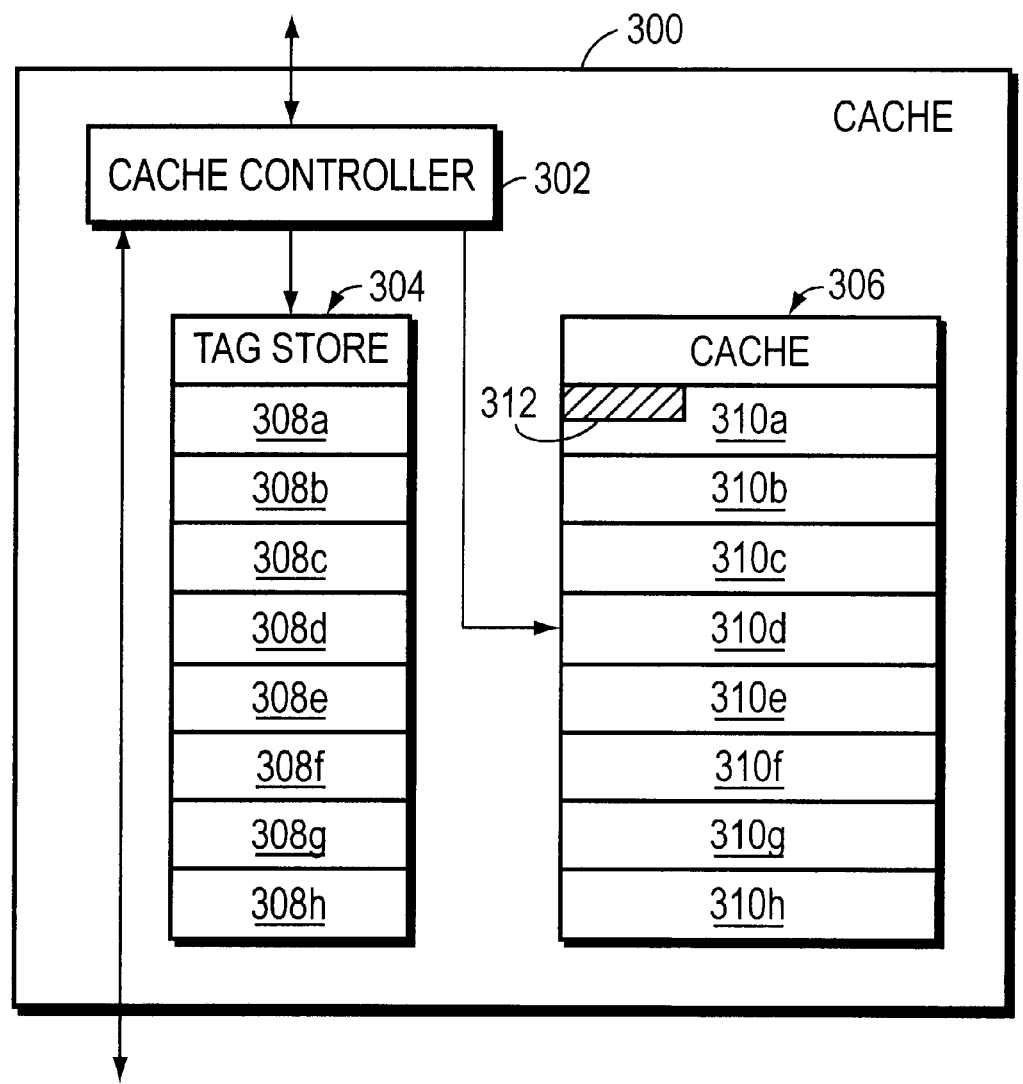
FIG. 3 is a highly schematic block diagram of a cache level of the computer system of FIG. 1.

FIG. 3 is a highly schematic block diagram of a cache memory module 300, such as the L1, L2 or L3 caches 206, 208 and 114. The cache memory module 300 preferably includes a cache controller 302, a tag store 304 and cache memory 306. In some systems, the tag store 306 is known as the "tag directory". Both the tag store 304 and the cache memory 306 are preferably organized as table arrays each having a plurality of entries. In particular, tag store 304 has entries 308a–h and cache memory 306 has entries 310a–h. Each entry 308a–h of the tag store 304 contains a main memory address (or a portion thereof) and a state for each cache line residing in a respective entry 310a–h of the cache memory 306.

The computer system 100 shown in FIG. 1 and the processing element 106 shown in FIG. 2 are for illustrative purposes only and are not meant to limit the present invention. Indeed, those skilled in the art will recognize that the present invention will be advantageous in many other, possibly far more complex, computer systems. The cache hierarchies, moreover, may be associated with the I/O subsystems 112 or with other entities of system 100 that utilize a cache system. The cache hierarchies may also have greater or fewer cache levels.

In operation, a CPU, such as CPU 202 at node 1, determines that its needs a particular instruction and/or data element. Most processors, including CPU 202, operate on a virtual addressing scheme. Thus, the CPU 202 specifies the requested instruction and/or data element by its virtual address. This virtual address is first provided to the TLB 204 so that it may be translated into a system address. As indicated above, all of the information stored in the memory subsystems 108 of system 100 is organized into units identified blocks and a unique system address is established for each block. The translated system address thus specifies a particular block. The translated system address is first applied to the cache hierarchy to see whether the requested block is already present in one of the cache levels. For this example, we will assume that the requested block has not been loaded into any cache level.

Figure 4A:
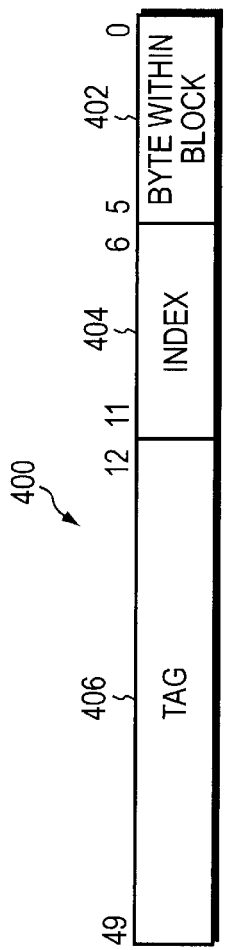
FIGS. 4A and 4B are highly schematic representations of data structures for use with the present invention.

FIG. 4A is a highly schematic illustration of a data structure representing a system address 400. System address 400 is preferably organized into several sections or fields. In the illustrative embodiment, system addresses, such as address 400, are fifty (50) bits long. That is, system address 400 defines bit positions "0" through "49", which will be represented herein by the following nomenclature "<49:0>". A byte_within_block field 402, which corresponds to bits <5:0>, specifies the particular byte of the respective memory block or cache line. As mentioned above, each block or cache line contains 64 bytes of information, and each byte can be separately addressed using field 402. An index field 404, which corresponds to bits <11:6>, specifies a particular entry 310 or set of entries 310 within cache memory 306, and is thus used to support direct mapping or setassociative mapping, whichever might be implemented by cache 300. The remaining bits <49:12>correspond to a tag field 406 and are sometimes referred to as the "tag bits". As described herein, the contents of the tag field 406 are used to match one or more entries of the tag store 304.

Those skilled in the art will recognize that system address 400 itself and/or any of its fields may have different lengths.

Figure 4B:
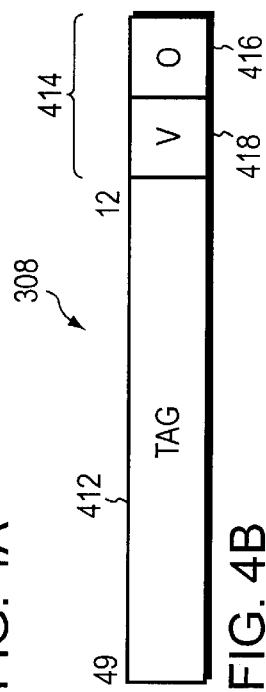

FIG. 4B is a highly schematic illustration of a data structure representing an entry 308 of tag store 304 (FIG. 3). Entry 308 basically has two components: a tag space 412 and a state or status space 414. The tag space 412 of entry 308 is loaded with the tag value, i.e., bits <49:12>, from the memory address 400 for the memory block stored in the respective cache entry 310. The status space 414 of entry preferably includes one or more state bits. In particular, a first bit 416 may be an ownership bit ("O"). If bit 416 is asserted, then the associated CPU 202 has exclusive ownership over the cache line corresponding to this tag value, i.e., the tag value store at tag space 412. If the ownership bit 416 is deasserted, the associated CPU 202 has shared access over the cache line. A second bit 418 is a so-called valid bit ("V"). If valid bit 418 is asserted, then the cache line corresponding to this tag value is considered to be valid and may be accessed and processed by the associated CPU 202.

Those skilled in the art will recognize that additional state or status bits may be included in space 414 of the tag store entry 308.

The translated system address 400 is received at the lowest cache level, i.e., L1 cache 206. The cache controller 302 preferably retrieves the index value from index field 404 and derives a corresponding entry from both the tag store 304 and the cache memory 306. Suppose, for example, that the index value identifies entry 308d of tag store 304, and entry 310g from cache memory 306. Next, the cache controller 302 retrieves the tag value from tag field 406, and compares it with the contents of the tag space 412 from the retrieved entry 308d of the tag store 304. The cache controller 302 also determines whether the valid bit 418 for this tag store entry 308d is asserted. If the tag store entry 308d is valid, as determined by valid bit 418, and the two tag values match, a cache "hit" is said to occur and the contents of the corresponding cache entry 310g are retrieved. The cache controller 302 then examines the value contained in the byte field 402 of the memory address 400 to determine which particular byte (or bytes) of the cache line the CPU 202 wants. This byte (or bytes) is then handed up to the CPU 202. The processing of this request is now complete.

If the tag store entry specified by the index value is invalid and/or the tag values do not match, a cache "miss" is said to occur. As described above, the requested cache line has not been loaded into any level of the cache hierarchy. Accordingly, the tag value from tag field 406 does not correspond to the tag value from entry 308d. In response, the cache controller 302 determines whether there is a next higher cache level. If so, the cache controller 302 passes the system address 400 to the next cache level, i.e., L2 cache 208. The L2 cache 208 similarly determines whether the system address hits on an entry in its tag store or whether there is a cache miss, as described above. This process is repeated until a cache miss occurs at the highest level cache, e.g., the L3 cache 114.

Since the requested cache line is not present in any levels of the cache hierarchy, a memory reference request is sent to the main memory subsystems 108 for the desired cache line. More specifically, a request is sent to the directory 110 that is associated with the particular main memory subsystem 108 at which the block is stored, i.e., to the block's so-called "home directory", based on a portion of the tag value of the system address 400. Suppose, for example, that the system address specifies a block from memory subsystem 108c. The request is then sent to directory 110c. Directory 110c determines where the most up-to-date copy of the requested block is located, e.g., a processor cache or a memory subsystem, and causes a copy of the block to be sent to node 1 from that location. The block is then copied into each level of the cache hierarchy at node 1, and provided to CPU 202.

Suppose, after the block is sent to node 1 and copied into each cache level of node 1's cache hierarchy, that the CPU 202 at node 4 requests exclusive ownership over this same cache line. Since the cache line is not present at any level of the cache hierarchy of node 4, a request for exclusive ownership of the cache line is sent to the home directory for this cache line, i.e., directory 110c. Directory 110c determines that a copy of the cache line is located at node 1. In order to keep node 1 from relying on what is about to become stale information, an invalidate request message is sent to node 1.

Figure 5:
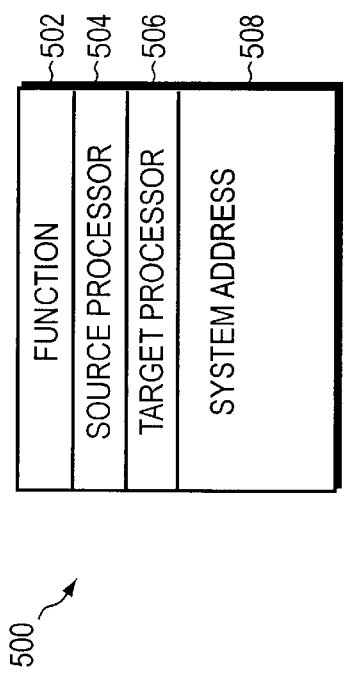
FIG. 5 is a highly schematic representation of a message used in the computer system of FIG. 1.

FIG. 5 is a highly schematic representation of a message format 500 for use with computer system 100 (FIG. 1). Message 500 comprises a plurality of fields, including a function field 502, source processor field 504, a target processor field 506 and a system address field 508. Here, function field 502 is preferably set by directory 110c to some predefined operation code value which nodes 102 recognize as being an invalidate request message. Field 504 is preferably loaded with the identifier assigned to the CPU 202 at node 4, which is the processor that initiated, i.e., sourced, the invalidate message. Field 506 is loaded with the identifier of CPU 202 at node 1, which is the destination, i.e., target, of the message 500. Alternatively or additionally, field 506 may be loaded with an identifier for node 1. Field 508 is loaded with the system address for the block being invalidated by the message 500.

Figure 6:
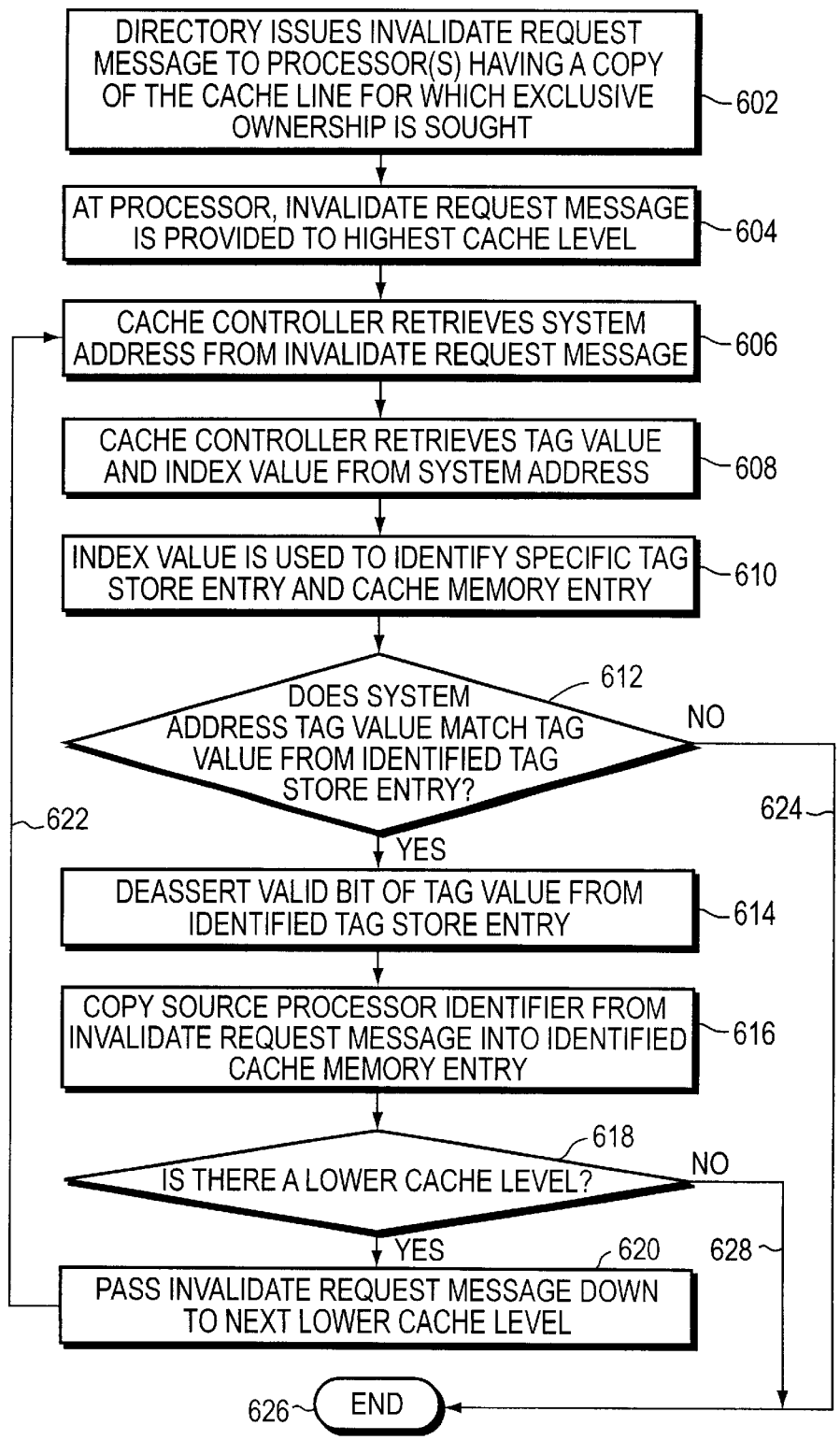
FIGS. 6 and 7 are flow diagrams in accordance with the method of the present invention.

FIGS. 6 and 7 are flow diagrams in accordance with the method of the present invention. As indicated above, in response to a request for exclusive ownership over a particular cache line, the home directory, e.g., directory 110c, issues an invalidate request message 500 to each node, such as node 1, having a copy of the specified cache line, as indicated at block 602. Upon receipt at the target node, the message 500 is passed to the highest level cache, e.g., L3 cache 114, of the target node, as indicated at block 604. The cache controller 302 of the L3 cache 114 retrieves the system address 400 from field 508 of the invalidate request message 500, as indicated at block 606. The cache controller 302 then retrieves the index value and the tag value from index field 404 and tag field 406 of the specified system address, as indicated at block 608.

Next, the cache controller 302 utilizes the index value to identify a particular entry, e.g., entry 308b, of the L3 cache's tag store 304 as well as the corresponding entry, e.g., 310a, of its cache memory 306, as indicated at block 610. A determination is then made whether there is a match between the tag value from field 406 (FIG. 4A) and the contents of the tag space 412 (FIG. 4B) of the identified entry 308b of the tag store 304, as indicated by decision block 612. If so, the cache controller 302 deasserts the valid bit 418 (FIG. 4B) from the identified entry 308b of its tag store 304, thereby reflecting that the respective cache line is invalid, as indicated at block 614.

In accordance with the preferred embodiment of the present invention, the cache controller 302 also copies the identifier of the source processor from field 504 of message 500 into the cache line at the identified entry, e.g., entry 310a, of its cache memory 306, as indicated at block 616. In other words, the cache controller 302 overwrites the existing contents of this entry 310a with the source processor identifier, as represented by hatched portion 312 (FIG. 3) of entry 310a. The cache controller 302 then determines whether there is a lower level cache in its cache hierarchy, as indicated by decision block 618. If so, the invalidate request message 500 is passed down to this next lower level, e.g., the L2 cache 208, as indicated at block 620. The L2 cache 208 repeats this process, searching its tag store 304 for the corresponding tag valve and, if a match is detected, deasserting the valid bit 418 and storing the source processor identifier at the corresponding entry of its cache memory 306, as indicated by arrow 622 returning processing to block 606.

Returning to decision block 612, if the tag value from tag field 406 of the system address contained in the invalidate request message 500 does not match the identified tag entry at any given cache level, then processing is complete, as indicated by No arrow 624 leading to end block 626. That is, since the system address of the invalidate request message 500 is not present in the tag store of the current cache level, e.g., L2, then it cannot be present in any lower cache levels, e.g., L1. Accordingly, the invalidate request message 500 need not be passed to these lower cache levels and can instead be discarded. For this example, suppose the cache line was located at and invalidated from each cache level. Similarly, with regard to decision block 618, if there is no lower cache level, e.g., the message was just processed at the L1 cache 206, then processing is complete, as indicated by No arrow 628 also leading to end block 626.

Figure 7A:
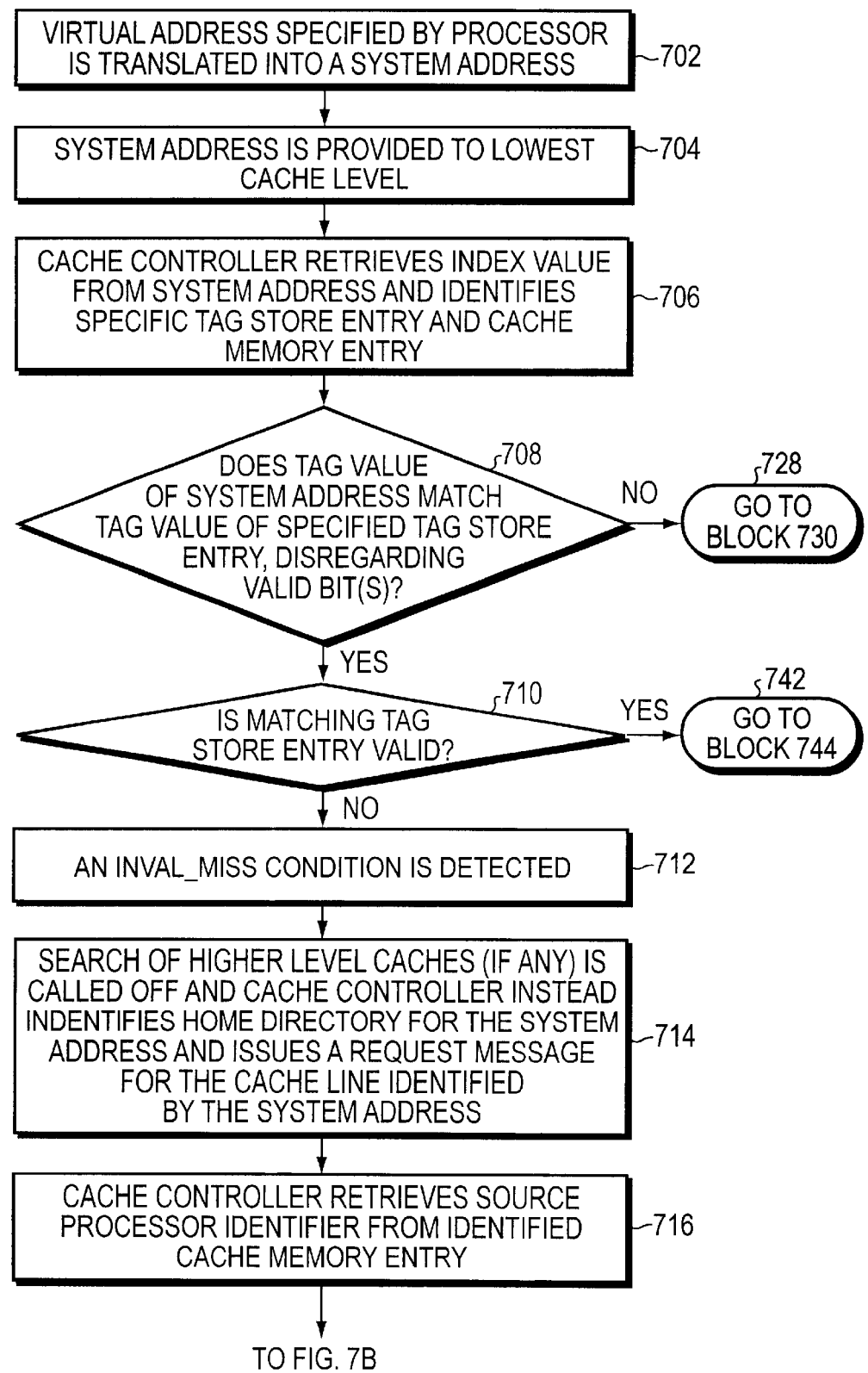
Figure 7B:
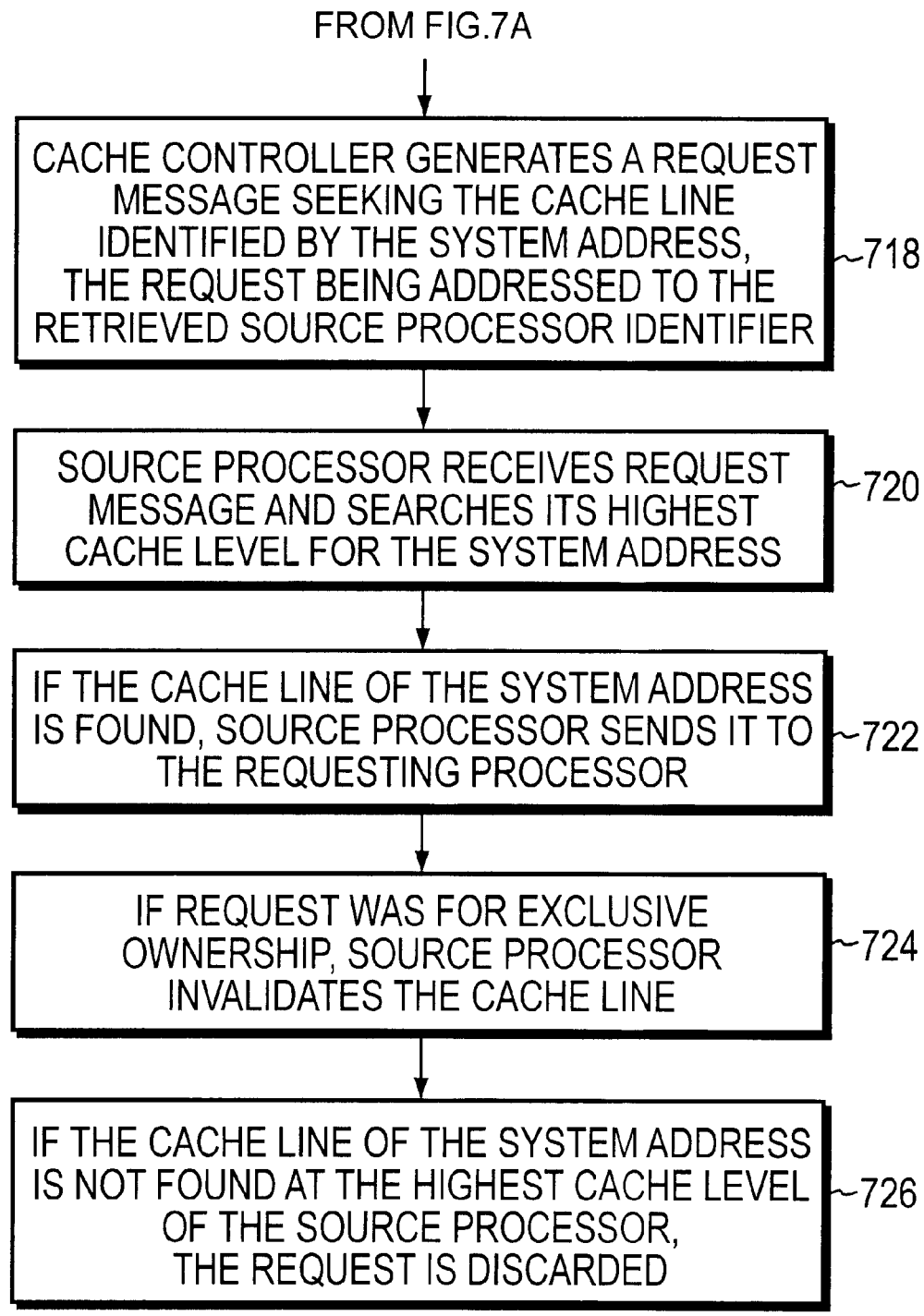
Figure 7C:
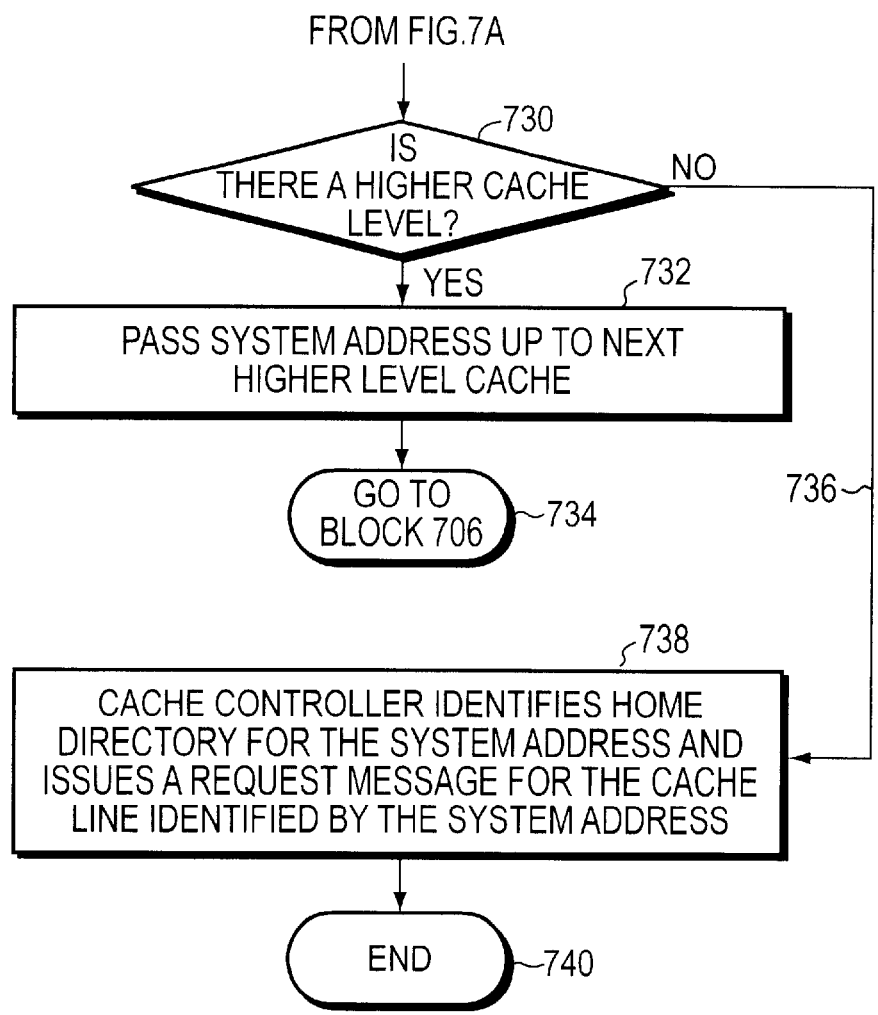
Figure 7C:
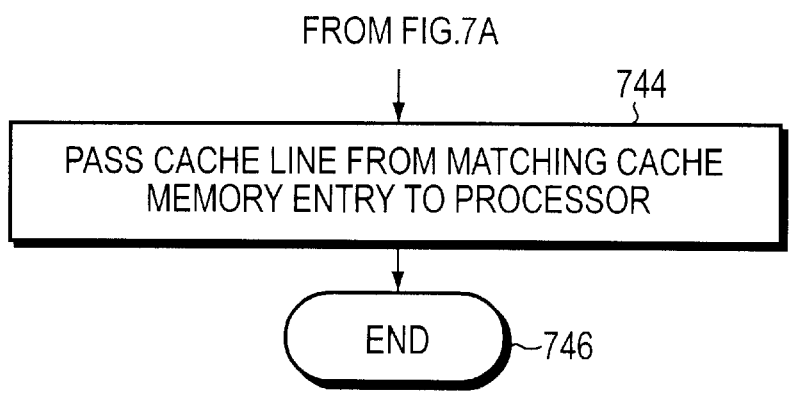

Suppose, after the respective cache entries have been invalidated, that CPU 202 at node 1 generates a request for this same cache line. FIGS. 7A–C are a flow diagram of the steps of this aspect of the present invention. First, the virtual address specified by CPU 202 is translated into a system address 400 by the TLB 204, as indicated at block 702 (FIG. 7A). Next, the system address 400 is provided to the lowest cache level of the cache hierarchy, e.g., L1 cache 206, as indicated at block 704. The cache controller 302 of the L1 cache 206 uses the index value from index field 404 to identify an entry, e.g., entry 308b, of its tag store 304 and an entry of its cache memory 306, as indicated at block 706. Next, the cache controller 302 compares the tag value from the system address 400 with the tag value from the identified tag store entry 308b. Although the two tag values match, the valid bit 418 was deasserted in response to the invalidate request message 500 that was received at node 1. With prior art systems, a match cannot occur if the valid bit is deasserted, thereby resulting in a cache miss, causing the next highest level cache to be searched and so on.

In accordance with the present invention, however, the comparison or matching process is preferably divided into two parts. First, the cache controller 302, disregarding the state of the valid bit 418, determines whether there is a match between the tag value from the system address 400 and the tag value stored in the tag space 412 of the identified entry 308b of its tag store 304 (i.e., that portion of the tag value from tag store 304 not including the valid bit 418), as indicated by decision block 708. If so, the cache controller 302 then determines whether the identified entry 308b of its tag store 304 is valid or not by examining the valid bit 418 of status space 414, as indicated by decision block 710. If the tag values match, but the entry is invalid, then the cache controller 302 treats this occurrence as an "inval_miss" condition, as indicated at block 712. Unlike a conventional cache miss, which causes a search to be performed at the next higher level cache, in response to an inval_miss, the cache controller 302 bypasses the higher level cache(s) and instead immediately issues a request for the cache line to the appropriate main memory subsystem 108.

More specifically, the cache controller 302 determines which directory, e.g., directory 110c, is the home directory for the system address, and issues a request to that directory 110c for a copy of the cache line, as indicated at block 714. Depending on the type of ownership request made by the CPU 202, the request issued by the cache controller 302 is either for shared or exclusive ownership. The request may generally take the form of message 500 (FIG. 5). In this case, the function field 502 would be loaded with a value that indicates that this message is a Read or a Read_Modify_ Request message. The target processor field 506 would be loaded with an identifier assigned to directory 110c or to the CPU 202 at node 3, and the system address field 508 would be loaded with the address of the desired cache line. The request message 500 is routed by interconnection network 104 to node 102c, and directory 110c causes a copy of the desired cache line to be returned to processor 202 at note 102a.

As shown, with the present invention, searches of higher levels of a cache hierarchy, e.g., the L2 cache 208 and the L3 cache 114, which necessarily consume some number of CPU clock cycles, are avoided upon detecting the novel inval_miss condition of the present invention. In addition, the request for the subject cache line is sent to the home directory 110c sooner than it would otherwise occur with the prior art systems, which have to search all cache levels of the cache hierarchy before issuing a request to main memory.

In accordance with a preferred embodiment of the present invention, the cache controller 302 alternatively or additionally issues a request for the desired cache line directly to the processor that is assumed to have the most up-to-date version. More specifically, upon detecting an inval_miss condition, the cache controller 302 may also retrieve the source processor identifier that was stored at the corresponding entry, e.g., hatched portion 312 of entry 310a of the cache memory 306, as indicated at block 716. A request message having the form of message 500 is then generated. This message 500, however, is directed to the processor whose identifier was stored at the respective cache entry, e.g., entry 310a, as indicated at block 718 (FIG. 7B). That is, the store source processor identifier, i.e., CPU 202 at node 4, is loaded into the target processor field 506 of the respective request message 500. This message 500 is routed by the interconnection network 104 to node 4. Node 4 searches its highest level cache, e.g., L3 cache 114d, for the address specified in the message 500, as indicated at block 720. If the subject cache line is found, node 4 sends a copy of it to CPU 202 at node 1, as indicated at block 722. If the request was for exclusive ownership of the cache line, node 4 also invalidates its copy of the cache line, as indicated at block 724. If the cache line is not in the highest cache level at node 4, the request message may simply be discarded, as indicated at block 726.

Since the CPU 202 at node 4 initiated the invalidate request that caused the copy of the cache line at node 1 to be invalidated, node 1 presumes that node 4 has the most up-to-date version of this cache line. In case node 4 no longer has the cache line and thus discards the request, a request may also be issued to the home directory 110 for this cache line, i.e., directory 110c, as indicated at step 714 (FIG. 7A). Thus, node 1 will eventually receive a copy of the cache line. Nevertheless, by also issuing a request to the CPU 202 or node assumed to have the most up-to-date version of the cache line, i.e., the CPU 202 at node 4, node 1 may receive a copy of the cache line faster than if a single request were only sent to the home directory 110 as with the prior art systems.

Returning to decision block 708 (FIG. 7A), if there is not a match between the tag value from the system address and the tag value from tag store 304, a GO TO block 728 advances processing to decision block 730 (FIG. 7C). By virtue of decision block 730, the cache controller 302, at the current cache level, e.g. L1 cache 206, determines, if there is a next higher cache level. If so, the system address is passed to this next cache level, as indicated at block 732. A GO TO block 734 then returns processing to block 706 (FIG. 7A) described above. If there is not a higher cache level, the current cache controller identifies the home directory 110 for the requested cache line and sends a request to this home directory 110, as indicated by No arrow 736 leading to block 738. Processing is then complete, as indicated by end block 740.

Returning to decision block 710 (FIG. 7A), if there is a match between the tag value of the system address and the tag value from the tag store 304, and it is a valid tag store entry, a GO TO block 742 (FIG. 7A) advances processing to block 744 (FIG. 7C). In this case, the cache controller 302 passes the cache line from the identified entry of its cache memory 306 to the CPU 202. Processing is then complete, as indicated by end block 746.

It should be understood that the ability to by-pass any higher cache levels as described herein can be advantageously incorporated into all but the highest cache level of a cache hierarchy. If we are already at the highest cache level, then by definition, there could be no by-passing of any higher level caches, and such a procedure would not provide any advantage.

The storing of a source processor identifier in response to an invalidate request message, however, is useful at all cache levels, including the highest, e.g. L3 cache 114, cache level. Thus, this aspect of the present invention could be used in a cache hierarchy having a single level.

It should be also understood that a cache may keep a copy of the source processor identifier contained in an invalidate request message 500 in a location other than the invalidated cache line. For example, the cache 300 may have one or more register(s) or other memory structures (not shown) for storing such source processor identifiers.

It should be further understood that a computer system, such as system 100 (FIG. 1), may permit the entries of one or more, but not all, levels of a cache hierarchy to be invalidated. For example, computer system 100 may support a "cache flush" operation whereby all the entries of a given cache level, e.g., L2 cache 208, are invalidated, while the entries of the other cache levels, e.g., L1 cache 206 and/or L3 cache 114, are not invalidated. Such cache flush operations are typically performed by deasserting or clearing all of the valid bits of the designated cache level. With such computer systems, it would be preferable to have some mechanism that prevents higher cache levels from being by-passed if the current level was invalidated through such an operation, as the cache line might be present in a higher cache level in this situation.

One solution would be to modify the cache flush operation to not only clear the valid bit 418 (FIG. 4B) of each tag store entry 308 (FIG. 3), but to also rewrite the contents of the tag space 412 to some value that could not possibly match the tag value 406 (FIG. 4A) of a system address 400. Thus, an "inval_miss" could not occur and higher level caches would not be bypassed. Another solution would be to provide a valid field having a plurality of bits for each tag store entry 308, and to not modify the cache flush operation. This valid field would preferably have at least one valid bit and one or more bits that could be set to indicate the circumstances under which the corresponding tag store entry 308 was invalidated. More specifically, these additional bits could be set differently depending on whether the tag store entry was invalidated as a result of a cache flush operation or an invalidate request received from some processor seeking exclusive ownership over the corresponding cache line. When the tag value 406 of system address 400 matches the tag value in the tag space 412, the cache controller 302 would preferably examine the valid field. If the valid bit is cleared, the cache controller 302 would examine the other bits of the valid field to decide whether or not to bypass any higher cache levels. For example, if the other bits indicate that the tag store entry was invalidated as a result of a request for exclusive ownership, the cache controller would bypass any higher cache levels. On the other hand, if the tag store entry was invalidated as a result of a cache flush operation, the cache controller would not bypass the next higher cache level, if any.

The foregoing description has been directed to specific embodiments of the present invention. It will be apparent, however, that other variations and modifications may be made to the described embodiments, with the attainment of some or all of their advantages. For example, invalidate requests may be issued in response to other actions besides a processor or entity seeking exclusive ownership over a shared cache line. Therefore, it is the object of the appended claims to cover all such variations and modifications as come within the true spirit and scope of the invention.

What is claimed is:

1. A method for use in a cache hierarchy including at least two cache levels organized as a lower cache level and a higher cache level, each cache level configured to store one or more cache lines, the method comprising the steps of:

providing a tag store at each cache level, the tag store containing tag values associated with the cache lines stored at the respective cache level, the tag values being settable between a valid state and an invalid state;

comparing at least a portion of the tag store of the lower cache level with a given tag value;

if the given tag value matches a tag value of the tag store, determining whether the matching tag value is in the valid state or the invalid state; and if the matching tag value is in the invalid state, bypassing the higher level cache.

2. The method of claim 1 wherein the tag store includes one or more valid bits associated with the tag values for use in setting the state of the tag values.

3. The method of claim 2 wherein the step of determining tag validity comprises the step of examining the one or more valid bits from the matching tag value of the tag store to determine the state of the matching tag value.

4. The method of claim 1 wherein the cache hierarchy is disposed in a computer system having a main memory, the method further comprising the step of issuing a request to the main memory in response to determining that the matching tag value is in the invalid state.

5. The method of claim 3 wherein the cache hierarchy is disposed in a computer system having a main memory, each cache line is associated with a corresponding system address that identifies a main memory location, and the given tag value is derived from a specified system address.

6. The method of claim 5 wherein the given tag value represents a portion of a system address for a cache line.

7. The method of claim 6 wherein the computer system has one or more processors, and the cache hierarchy is associated with a given processor.

8. The method of claim 7 further comprising the step of setting a particular tag value to the invalid state in response to receiving an invalidate request message specifying the particular tag value.

9. The method of claim 8 wherein the invalidate request message is initiated by a source processor having a corresponding identifier, the method further comprising the step of storing the source processor identifier from the invalidate request message at the cache line associated with the particular tag value specified by the invalidate request message.

10. The method of claim 9 further comprising the steps of:
in response to determining that the matching tag value is in the invalid state, retrieving the source processor identifier from the cache line associated with the matching tag value;
issuing a request to the source processor for the cache line represented by the matching tag value that is in the invalid state.

11. The method of claim 10 wherein the cache hierarchy is disposed in a computer system having a main memory, the method further comprising the step of issuing a request to the main memory for the cache line represented by the matching tag value that is in the invalid state.

12. A method for use in a cache hierarchy including at least one cache level, the at least one cache level configured to store one or more cache lines, the method comprising the steps of:
providing a tag store at the at least one cache level, the tag store containing tag values associated with the cache lines stored at the cache level, the tag values being settable between a valid state and an invalid state;
receiving an invalidate request message specifying a given tag value and a source processor identifier;
comparing at least a portion of the tag store with the given tag value;
if the given tag value matches a tag value of the tag store, setting the matching tag value to the invalid state; and
storing the source processor identifier from the invalidate request message at the cache line associated with the particular tag value specified by the invalidate request message.

13. The method of claim 12 wherein
the computer system has one or more processors, and
the cache hierarchy is associated with a given processor.

14. The method of claim 13 further comprising the steps of:
receiving a request for a cache line initiated by the given processor that is associated with the cache hierarchy, the request specifying a tag value;
comparing at least a portion of the tag store with the received tag value;
if the received tag value matches a tag value of the tag store, determining whether the matching tag value is in the valid state or the invalid state;
if the matching tag value is in the invalid state, retrieving the source processor identifier from the cache line associated with the matching tag value; and
issuing a request to the source processor for the cache line represented by the matching tag value that is in the invalid state.

15. The method of claim 14 wherein the cache hierarchy is disposed in a computer system having a main memory, the method further comprising the step of issuing a request to the main memory for the cache line represented by the matching tag value that is in the invalid state.

16. The method of claim 15 further comprising the step of, if the source processor has the cache line represented by the tag value specified in the request and the cache line is in the valid state, returning the cache line.

17. The method of claim 16 wherein the cache hierarchy includes at least two cache levels organized as a lower cache level and a higher cache level, each cache level having a tag store and configured to store one or more cache lines, the method further comprising the steps of:
if the tag value received from the given processor that is associated with the cache hierarchy does not match a tag value from the tag store of the first cache level, passing the tag value to the second cache level;
comparing at least a portion of the tag store of the second cache level with the received tag value;
if the received tag value matches a tag value of the second level tag store, determining whether the matching tag value is in the valid state or the invalid state;
if the matching tag value is in the invalid state, retrieving the source processor identifier from the cache line associated with the matching tag value and stored at the second level; and
issuing a request to the source processor for the cache line represented by the matching tag value that is in the invalid state.

18. The method of claim 13 wherein the cache hierarchy includes at least two cache levels organized as a lower cache level and a higher cache level, each cache level having a tag store and configured to store one or more cache lines, the method further comprising the steps of:
receiving a request for a cache line from the given processor, the request specifying a tag value;
comparing at least a portion of the tag store associated with the lower cache level with the received tag value;
if the received tag value matches a tag value of the tag store associated with the lower cache level, determining whether the matching tag value is in the valid state or the invalid state; and
if the matching tag value is in the invalid state, bypassing the higher level cache.

19. The method of claim 18 further comprising the steps of:
if the cache line corresponding to the matching tag value from the tag store associated with the lower cache level contains a source processor identifier, retrieving the source processor identifier; and
issuing a request to the source processor whose identifier was retrieved from the corresponding cache line.

20. A cache hierarchy comprising:
first and second cache levels organized such that the first cache level is a lower level and the second cache level is a higher level, each cache level configured to store a plurality of cache lines;
a cache tag store associated with the first and second cache levels, the tag store including tag values indicated whether a given cache line is valid or invalid; and
a cache controller operably coupled to the at least two cache levels, wherein
the cache controller searches the cache tag store for requested cache lines, and
if a requested cache line is found in the lower cache level and is invalid, the cache controller bypasses the higher cache level.

21. The cache hierarchy of claim 20 wherein,
the cache hierarchy is disposed in a computer system having a main memory, and
the cache controller issues a demand for the requested cache line to the main memory.

22. The cache hierarchy of claim 21 wherein
the computer system has at least one processor, and
the cache hierarchy is associated with the at least one processor.

* * * * *